W. E. COPITHORN.
DEMOUNTABLE RIM.
APPLICATION FILED NOV. 6, 1919.

1,354,468.

Patented Oct. 5, 1920.

Inventor.
Walter E. Copithorn
by Beard Smith & Tennant
Attys.

UNITED STATES PATENT OFFICE.

WALTER E. COPITHORN, OF NATICK, MASSACHUSETTS.

DEMOUNTABLE RIM.

1,354,468.  Specification of Letters Patent.  Patented Oct. 5, 1920.

Application filed November 6, 1919. Serial No. 336,137.

*To all whom it may concern:*

Be it known that I, WALTER E. COPITHORN, a citizen of the United States, residing at Natick, county of Middlesex, State of Massachusetts, have invented an Improvement in Demountable Rims, of which the following description, in connection with the accompanying drawing, is a specification, like characters on the drawing representing like parts.

This invention relates to demountable rims of the type which are made of a plurality of sections, and the object of the invention is to provide an improved means of locking or connecting together the sections.

In order to give an understanding of my invention, I have illustrated in the drawings some selected embodiments thereof which will now be described, after which the novel features of the invention will be pointed out in the appended claims.

In the drawings, Figure 1 is a side view of a demountable rim embodying my invention having the tire applied thereto;

Figure 2:
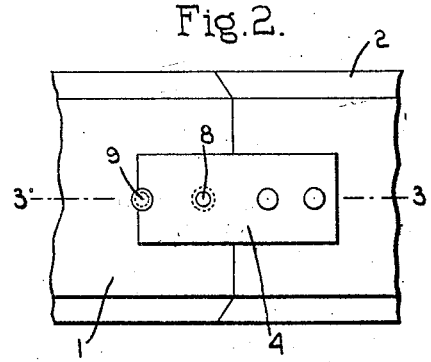
Fig. 2 is a plan view showing the manner in which the two meeting ends of two sections are connected together.

I have illustrated my invention as embodied in a demountable rim of that type comprising three sections. The three sections of my rim are indicated at 1, 2 and 3, respectively. The ends of the section 1 are detachably connected to the meeting ends of the sections 2 and 3 by a novel connection illustrated in Figs. 2 and 3. The end of one section is provided on its inner face with an extension having a notch in its end and a tapered aperture, and the end of the other section is provided with a headed stud adapted to enter the notch of the extension and a tapered projection adapted to enter the tapered aperture.

In the construction herein shown the sections 2 and 3 each have the extensions thereon and the projections are in the ends of the sections 1. This is illustrated more in detail in Figs. 2 and 3 where the end of the section 2 is shown as having the extension 4 in the form of a plate which is riveted to the end of the section 2 on its inner face and extends beyond said end. This extension 4 is provided with a tapered aperture 5 and also with a notch 6 in its end, said notch having the chamfered or beveled surface 7. The end of the section 1 is provided with a tapered projection 8 of a size to fit the tapered aperture 5, and also with a headed stud 9 adapted to enter the notch 6. This stud 9 is formed with a tapered head 10, the taper of which corresponds to the beveled face 7.

The rim section 1 is formed at each end with a projection 8 and headed stud 9.

Figure 1:
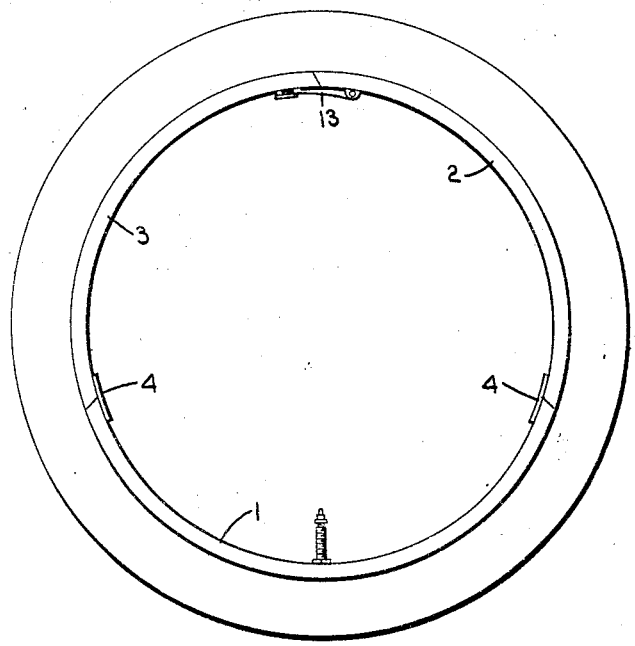
Figure 3:
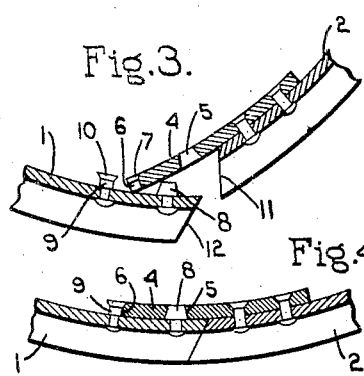
Fig. 3 is a section on the line 3—3, Fig. 2, showing the two rim sections in broken position ready to be connected.
Figure 4:
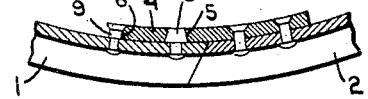
Fig. 4 is a section on the line 3—3, Fig. 2, showing the parts in their operative relation.

In assembling the parts of the rim the ends of the rim sections 2 and 3 are swung inwardly into the position relative to the rim section 1 shown in Fig. 3 so that the extension on each rim section overlies the projection 8, and the extension is then moved longitudinally of the rim 1 until the notch 6 embraces the headed stud 9, at which time the rim sections 2 and 3 are swung outwardly until they come into their proper circular relation relative to the rim section 1 shown in Fig. 4. When in this position the projection 8 enters the tapered aperture 5 and the extension 4 lies flatly against the inner face of the rim section 1. The projection 8 prevents any longitudinal or separating movement of the tire sections relative to each other and the engaging of the head 10 of the projection 9 with the beveled face 7 holds the rim sections in proper relative position radially. The ends 11 and 12 of the rim sections 1, 2 and 3 will preferably be beveled, as shown.

Figure 5:
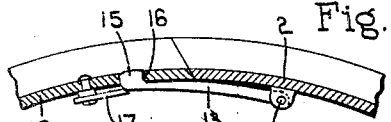
Fig. 5 is a section through the locking device.
Figure 6:
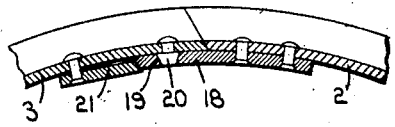
Fig. 6 is a section similar to Fig. 5 showing a modification of the invention.
Figure 7:
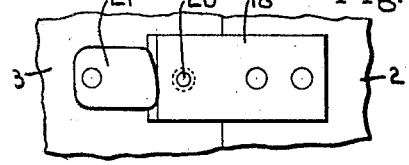
Fig. 7 is an underside view of Fig. 6.

For locking the meeting ends of the rim sections 2 and 3 together, I may provide either the construction shown in Fig. 5 or that shown in Figs. 6 and 7. In Fig. 5 the rim section 2 is shown as having a locking lever 13 pivoted to the inner face thereof at 14, and said locking lever has a nose or projection 15 at its outer end adapted to enter an aperture 16 formed in the rim section 3. The locking lever is held in its locking position by means of a button 17 pivoted to the rim section 3.

In Figs. 6 and 7 I have shown a construction wherein the rim section 2 has an arm or plate 18 rigid therewith but extending beyond the end thereof and which overlies the inner face of the rim section 3. This plate or extension 18 is provided with a tapered aperture 19 in which is received a tapered projection 20 rigidly formed on the rim section 3.

21 is a button pivoted to the rim section 3 and adapted to engage the end of the extension 18 and hold the rim sections 2 and 3 in their proper radial position.

I claim:

1. A demountable rim comprising a plurality of sections, one of which is provided with an extension at its end having a tapered aperture and a notch at its extremity, and the other of which is provided with a tapered projection to enter said aperture, and a headed stud to engage said notch.

2. A demountable rim comprising a plurality of sections, one of which is provided with an extension at its end having a tapered aperture and a notch at its extremity, and the other of which is provided with a tapered projection to enter said aperture, and a headed stud to engage said notch, the head of the stud overlying said extension and holding the rim sections from radial movement relative to each other.

In testimony whereof I have signed my name to this specification.

Dr. WALTER E. COPITHORN.